Nov. 15, 1960          H. J. WISE          2,959,983

ACTUATOR UNIT FOR ROTARY DEVICES

Filed Dec. 3, 1958

INVENTOR.
HOMER J. WISE

BY Golrick + Golrick

ATTORNEYS

United States Patent Office 2,959,983
Patented Nov. 15, 1960

2,959,983

ACTUATOR UNIT FOR ROTARY DEVICES

Homer J. Wise, Twin Lakes, Ohio, assignor to The Huber & Wise Co., Kent, Ohio, a corporation of Ohio Filed Dec. 3, 1958, Ser. No. 777,983

7 Claims. (Cl. 74—626)

The present invention is concerned generally with an actuator unit for rotary devices such as valves or the like; and more particularly with an electric motor driven actuator unit including a high ratio speed reduction mechanism which also permits operation of the device normally actuated thereby, independently of the motor of the unit, by some other source of power, for example by manual operation. Electrically powered actuator units are often used for various devices having a rotationally moved element; for example butterfly type valves controlling flow of gases or liquids. In such cases it is often desired to use an electric motor normally operating at relatively high speed in comparison with the rotational speed required in the device powered thereby.

The speed reduction mechanism consequently is required between the output shaft of the actuator unit and its motor, is preferably of a compact form to keep the overall size of the unit small. Further, it is often a requisite of such an actuator unit that means be provided for manual operation of the unit to provide for the eventuality of electric power failure or failure of the motor as such whereby manual rotation of the unit output shaft in at least one direction is possible.

In the actuator unit of the present invention, as a part of the speed reduction mechanism there is employed a walking gear carried on a driven eccentric and meshed with an internal ring gear, with a small tooth number difference between the walking gear and ring gear. In this structure well known to the prior art, the walking gear, for each revolution of the eccentric on which it is carried, does itself rotate about its own translated axis by a fraction of a revolution corresponding to the angular spacing represented by a number of its teeth equal to the difference in number of teeth between ring gear and walking gear. Usually in prior art structures, however, the revolution of the walking gear about its own axis is communicated to an output shaft of fixed axial position through a floating coupling plate joined to the walking gear on one side by a pair of diametrically located radial pin and slot connections and on the other side joined to a rotatable output member by another pair of diametrically disposed radial pin and slot connections located 90° away from the first.

By the unit of the present invention such a coupling plate with its described connections to the walking gear and the output member is entirely eliminated. Further, to permit rotation of the output member in at least one direction independently of the motor, for example by manually applied torque, the ring gear is so mounted that under certain conditions it is held stationary and under other conditions is rotationally free. Specifically the ring gear is held against rotation by a detent notch and pin arrangement. Normally the output shaft is power driven in that direction for which it is desired that manual turning of the output shaft be permitted. The detent pin structure is such, however, that when the manual rotation of the shaft is effected in the said direction the force reactions in the reduction mechanism cause the ring gear ultimately to disengage from the holding pin or pins, thereby permitting the manual rotation of the output member free of the motor.

The general object of the present invention is then to provide an improved electric motor powered rotary actuating device providing a high ratio of speed reduction between motor and output shaft of the unit. Another object of the present invention is to provide a rotary actuator unit including an eccentrically driven and orbitted gear member as a walking gear meshed with an internal ring gear of simpler construction than prior art devices. A still further object is the provision of the actuator unit of the character described adapted to manual operation in at least one direction of rotation of the output shaft thereof. Other objects and advantages will appear from the following description of the drawings wherein:

Figure 1:
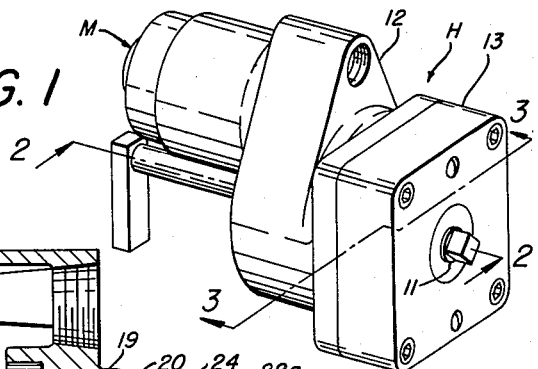
Fig. 1 is a perspective view of an actuator unit embodying the present invention.
Figure 2:
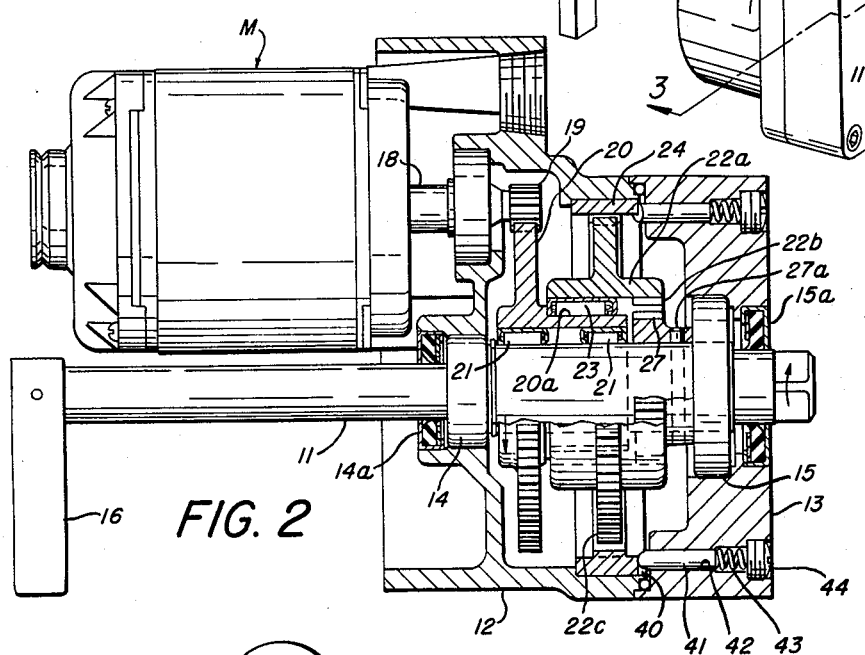
Fig. 2 is a side view of the unit shown in Fig. 1 with certain parts broken away and partially in section taken as indicated by the line 2—2 in Fig. 1.

The actuator unit includes an electric motor M for driving the output shaft 11 through a speed reduction mechanism enclosed in the housing H formed by the housing members 12, 13 and having aligned apertures through which opposite ends of the shaft extend, the shaft being rotatably supported therein by respective bearings 14, 15 with suitable oil seal units 14a, 15a outboard thereof. As viewed in Figs. 1 or 2 the right end of the shaft is intended to be coupled to the actuated device. For this purpose the member 13 may serve as a base whereby the entire unit may be mounted on and secured to the device actuated thereby; and the squared shaft end may be used for engagement in a like shaped socket of a rotationally driven member of such device. A handle 16 is secured to the left projecting end of shaft 11 for manual operation as may be required.

The motor M is mounted directly on, and has its rotor shaft 18 extending through the left end wall of, housing member 12; the motor shaft carrying a pinion 19 meshed with a gear element 20 rotatably supported on the shaft 11 by needle bearing units 21 as a first speed reduction stage, with for example 16 and 41 teeth on pinion and gear. In the gear element 20, the hub portion 21a, elongated to the right, has a cylindrical external surface eccentric to the common axis of shaft 11 and the gear, on which a walking gear member 22 is rotatably supported by suitable needle bearing 23, the external gear formation 22c being meshed with an internal ring gear 24 in a further stage of speed reduction. A large hub of member 22, formed by oppositely axially extending cylindrical flanges, is suitably bored from the left end of flange 22a coaxially relative to the external gear formation 22c to accommodate the bearing 23; while an internal gear 22b, formed on the other flange coaxial with 22c, is meshed with an external gear 27 coaxial with shaft 11 and secured thereto as by a pin 27a.

For a relative large reduction ratio, ring gear 24 has one tooth more than 22c, say 67 and 66 teeth respectively; and 22b and 27 have equal numbers of teeth but different pitch diameters, say 34 teeth each.

Figure 4:
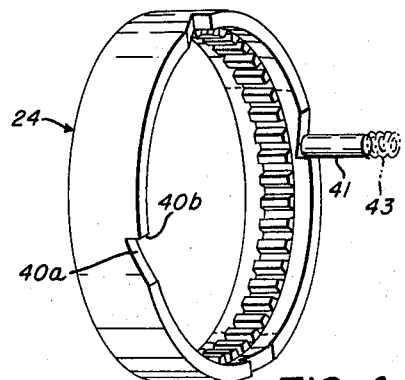
Fig. 4 is a detail view in perspective of a ring gear and of a detent pin cooperating therewith.

It is to be noted that the right or open end of housing member 12 is bored to provide end shoulder and circumferential surfaces as a seat in which the ring gear 24 may be rotatably shifted for purposes to be explained. A plurality of equi-angularly spaced like detent formations or notches 40 (here four) are cut in the right end of the ring gear 24 for cooperation with diametrically paired pins 41, each axially movable in a bore 42 in housing member 13, and biased toward the ring gear by a compression spring 42 interposed between the pin and a retainer screw 44. As best seen in Fig. 4, each notch has a wall 40a sloping inward from the end face of the ring gear to terminate at the axially directed shoulder or surface 40b. The end face of each pin may be oblique to correspond generally with the notch slope. Hence any tendency of the ring gear toward counter-clockwise movement is inhibited by engagement of shoulders 40b with respective pins; while a clockwise torque applied to the ring gear, if sufficient to overcome the effective forces of spring 43 and frictional forces, will allow clockwise rotation of the ring gear by outward camming of pins 41 on surfaces 40a.

Figure 3:
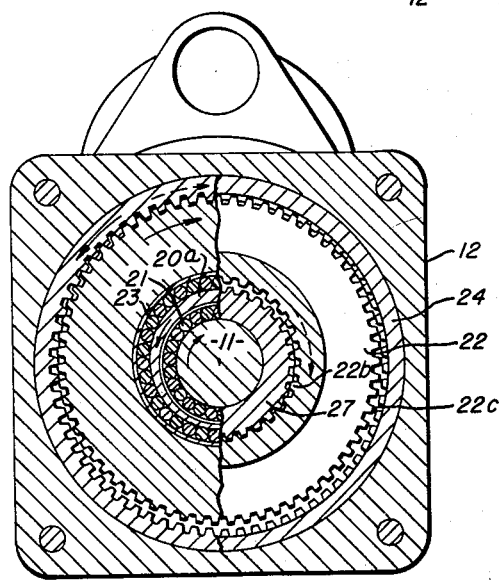
Fig. 3 is an irregular section taken as indicated by the line 3—3 in Fig. 1.

Considering motion as seen in Fig. 3 (i.e. as viewed from the right end of Fig. 1), clockwise motor rotation produces a counter clockwise rotation of eccentric 22a at a reduced rate corresponding to the reduction ratio of 19 and 20, thereby causing the axis of member 22 to move in an orbital path about the axis of 11. Hence for each revolution of the eccentric, due to the one tooth difference in 22c and 24, there will also be rotation of 22 about its axis corresponding to the angular spacing between centers of adjacent teeth on 22c, gear 24 being held stationary by engagement with pins 41. The sense of this rotation is however clockwise, opposite to that of the eccentric. At the same time since 22b and 27 are always in mesh, the rotation of 22 relative to its own axis is imparted to the gear 27 and hence a much reduced clockwise rotation is attained in shaft 11. Where 22b and 27 have a like number of teeth, the rotation of 11 is equal to and in the same sense as that of 22 about its own axis; but where 22b has a larger number of teeth, a higher rotation results in shaft 11 than that of 22 about its own axis. The above described tendencies or motions are indicated by the solid direction arrows of the drawing. With the tooth numbers above given by way of example, a motor running at 1750 r.p.m. will provide an output shaft rotation of 3 r.p.m., more precisely 3.088 r.p.m.

Now in the event that the shaft is turned manually in clockwise direction, it applies a clockwise torque on 24 which tends to move ring gear 24 in sense opposite the reaction of gear 22 thereon during motor drive, as indicated by the dashed arrows. Accordingly the pins 41 are cammed against the springs, and by riding up the notch slopes, escape the notches to free ring gear 24. Hence shaft 11 is free to turn without rotating the entire speed reduction mechanism and motor.

When the output shaft is driven in a counter-clockwise direction by the motor, developing reactions of gear 22 on ring gear 24 which would tend to move the latter clockwise, the spring force applied through the pins to sloping walls 40a of the notches prevents the ring gear from rotating. However, upon application of a counter-clockwise torque (as viewed in Fig. 3) to the handle 16, the reaction of gear 22 tends to move the ring gear 24a in a counter-clockwise direction, the notch shoulders 40b engage the pins, the ring gear is not released, and accordingly manual operation in this sense involves rotation of the entire reduction train and motor.

I claim:

1. A speed reduction mechanism including a rotary input element and a rotary output element and adapted to rotation of said output element in at least one direction independently of said input element, comprising: a casing, an output element rotatably supported therein, an input element supported in the casing for rotation about an axis aligned with the rotational axis of said output element, said input element having an eccentric carrier portion, an internally toothed ring gear rotatably mounted in the casing coaxially of said output element, an external gear rotatable on the eccentric portion and meshed with the ring gear, the external gear having fewer teeth than the ring gear, an internal gear formation on one side of and coaxial with said external gear, an output external gear secured coaxially on said output element and meshed with said internal gear formation, means for applying torque to said output element, and cooperating detent means on said ring gear and casing holding the ring gear from rotation in one direction and permitting rotation in the other direction.

2. The mechanism described in claim 1 wherein said detent means comprises a pin slideable in the casing and spring biased toward the ring gear, and a shoulder formation in the ring gear engageable by the pin to prevent rotation in said one direction.

3. The mechanism described in claim 1 wherein said means for applying torque to said output element comprises a handle engaged with the output element and accessible externally of the casing for operator manipulation.

4. The mechanism described in claim 1 wherein the said internal gear formation and said output external gear have equal numbers of teeth and effective pitch diameters differing by twice the eccentricity of said eccentric portion.

5. The mechanism described in claim 1 wherein there is a one tooth difference between the ring gear and said external gear.

6. In a speed reducing rotary actuator including a rotary driven input shaft and a rotary output shaft and adapted to rotation of said output shaft in one direction independently of the said input shaft, the combination comprising: a casing, an output shaft rotatably supported therein, an input gear supported coaxially of the output shaft for rotation relative thereto and adapted to rotation in response to rotation of said input shaft, said input gear having an externally cylindrical hub portion disposed eccentrically to said output shaft as a gear carrier, an internally toothed ring gear rotatably mounted in the casing coaxially of said output shaft, an external gear rotatable on said gear carrier and meshed with the ring gear, internal gear means and external gear means meshed therewith, one of said gear means being fixed on and coaxial with said external gear and the other said gear means secured on the said output shaft, handle means manually accessible externally of the casing for applying torque to said output shaft, and cooperating detent means on said ring gear and casing holding the ring gear from rotation in one direction and permitting rotation in the other direction.

7. The mechanism described in claim 6 wherein said detent means comprises a pin slideable in the casing and spring biased toward the ring gear, and a shoulder formation in the ring gear engageable by the pin to prevent rotation in said one direction.

References Cited in the file of this patent

UNITED STATES PATENTS

| | | |
|---|---|---|
| 1,514,948 | Taub | Nov. 11, 1924 |
| 2,300,343 | Clay | Oct. 27, 1942 |
| 2,453,949 | Ulinski | Nov. 16, 1948 |
| 2,481,627 | Sharpe | Sept. 13, 1949 |
| 2,846,034 | Mnos | Aug. 5, 1958 |